United States Patent
Jainek et al.

(10) Patent No.: US 6,485,637 B2
(45) Date of Patent: Nov. 26, 2002

(54) LIQUID FILTER WITH A DRAIN FOR RESIDUAL LIQUID

(75) Inventors: Herbert Jainek, Heilbronn (DE); Martin Weindorf, Kornwestheim (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/741,096

(22) Filed: Dec. 21, 2000

(65) Prior Publication Data

US 2002/0020660 A1 Feb. 21, 2002

(30) Foreign Application Priority Data

Dec. 21, 1999 (DE) .......................................... 199 61 580

(51) Int. Cl.⁷ ...................... B01D 35/147; B01D 35/157
(52) U.S. Cl. ........................ 210/130; 210/248; 210/440; 210/457
(58) Field of Search ................................ 210/130, 248, 210/313, 433.1, 440, 444, 457, DIG. 17, 429

(56) References Cited

U.S. PATENT DOCUMENTS 5,431,588 A * 7/1995 Kucik .......................... 440/88
5,888,384 A  3/1999 Weiderhold et al. ......... 210/130
5,902,479 A * 5/1999 Fukumori et al. ........... 210/248

FOREIGN PATENT DOCUMENTS

| DE | 196 44 647 | 4/1998 | |
| FR | 1544964 | * 11/1968 | ................. 210/444 |

* cited by examiner

Primary Examiner—Matthew O. Savage
(74) Attorney, Agent, or Firm—Crowell & Moring LLP

(57) ABSTRACT

A liquid filter, suitable for the lubricating oil of an internal combustion engine, having a cartridge installation opening 15 which faces substantially downward, a positively guided oil drain 28 is proposed for draining oil from the filter when the filter cartridge is changed. The positive guidance is effected by a valve stem 29 which is connected directly or indirectly to the housing by a support tube 22. It opens a gasketed drain opening which can be connected to a hose 35 in order to assure drainage of oil, for example, to a separate oil collecting vessel. The drain opening is automatically opened by unscrewing the screw-on cover 11. No other drain plug or the like needs to be opened. This filter is especially suited for installation in confined spaces since the oil can be drained in a reliable manner.

9 Claims, 2 Drawing Sheets

LIQUID FILTER WITH A DRAIN FOR RESIDUAL LIQUID

BACKGROUND OF THE INVENTION

The invention relates to a liquid filter, especially for the lubricating oil of an internal combustion engine, which comprises a cylindrical or pot-like housing with a screw-on cover, having an outlet or drain for residual liquid included in the screw-on cover. The invention furthermore relates to a filter cartridge which is suitable for installation in the liquid filter of the invention.

A liquid filter of this kind is disclosed, for example, in DE 196 44 647 A1. This filter has a cylindrical housing with an opening for the installation of the filter cartridge which faces downward, and into which a screw-on cover can be installed after the filter is inserted. The inlet and outlet for the filter are situated in the cylindrical housing, i.e., in the upper part of the filter. Thus the filter and especially the screw-on cover are always filled with the liquid being filtered, even when the filter is not in operation. This makes it difficult to change the filter cartridge since this residual liquid can escape into the environment when the cover is unscrewed. Therefore a threaded drain plug is provided in the screw-on cover at its geodetically lowest point, which must initially be unscrewed to remove the residual liquid in the screw-on cover in order to make it easier to replace the filter cartridge.

The proposed liquid filter is used in particular as an oil filter in internal combustion engines. Here the available space is often very limited due to other components in the engine compartment. Consequently, the removal and replacement of the drain screw often involves problems. Moreover, the oil running out of the drain hole has to be collected, and due to the restricted space this is often possible only under burdensome circumstances, since a drain vessel of sufficient capacity cannot be placed under the drain hole.

SUMMARY OF THE INVENTION

It is therefore the object of the invention to provide a liquid filter with a liquid drain in the screw-on cover.

A further object of the invention is to provide a liquid filter which can be reliably emptied even when installed in a limited space.

It is also an object of the invention to provide a filter cartridge which is suitable for installation in a liquid filter with a liquid drain in the screw-on cover and which facilitates reliable emptying of the filter even when the filter is installed in a limited space.

These and other objects are achieved in accordance with the present invention by providing a liquid filter comprising a housing with an inlet and an outlet for a liquid to be filtered, said housing having a downwardly facing, filter cartridge installation opening and a screw-on cover for closing said cartridge installation opening, a filter cartridge disposed sealingly in said housing between said inlet and said outlet such that liquid from said inlet must pass through the cartridge to reach said outlet, wherein said screw-on cover is provided with a drain through which liquid may be discharged from said housing before changing the filter cartridge, and said drain is provided with a connection for a removably attachable draining device.

In accordance with another aspect of the invention, the objects are achieved by providing a liquid filter comprising a housing with an inlet and an outlet for a liquid to be filtered, said housing having a downwardly facing, filter cartridge installation opening and a screw-on cover for closing said cartridge installation opening, a filter cartridge disposed sealingly in said housing between said inlet and said outlet such that liquid from said inlet must pass through the cartridge to reach said outlet, wherein said screw-on cover is provided with a drain through which liquid may be discharged from said housing before changing the filter cartridge, wherein said drain comprises a drain opening disposed on a central axis of said housing and cover; said drain being sealingly closed by a valve stem which is connected to said housing such that it is axially movable in said drain opening when said screw-on cover is moved.

The liquid filter of the invention is intended for installation in a downwardly hanging position. That means that the opening in the cylindrical housing for the insertion of the filter cartridge, which is closed by the screw-on cover, faces downward. It is not necessary, however, for the axis of the housing to be vertical. It is also possible to orient the housing such that its central axis extends downward at an inclined angle. It is not necessary for the housing to be a separate component. It is also conceivable that it could be formed together with another component, for example, the engine block.

In the screw-on cover there is an outlet or drain for residual liquid, which according to the invention has a connection for a draining device which is installed for the purpose of draining the residual liquid, and which can be detached again after the liquid residue has been removed. This has the advantage that in the immediate area of the drain, space needs to be available only for connecting the draining device. The draining device can be connected to the drain, and the drain is subsequently opened. The draining device conveys the liquid to a collection container provided to collect it. As soon as the liquid residues have been removed from the housing, the draining device can be detached so that it no longer interferes with the opening of the screw-on cover.

In one specific embodiment of the invention, the draining device comprises a hose which can be attached to a mating hose connector on the screw-on cover. This variant constitutes an especially easy way to create a draining device. In this way large expenditures for components can be avoided, which contributes to the economical nature of the solution. Such drain hoses are easy to obtain and are available in workshops which service internal combustion engines.

An alternative embodiment envisions forming a drain in a filter of the type described above, by providing a valve stem which closes the drain hole by means of a seal. The seal can be an O-ring, for example, but it is also possible that the valve stem itself provides such sealing function due to the material from which it is made. The valve stem is connected with the housing such that its axial movement is limited with respect to the central axis of the housing. This is to be understood to include the possibility of providing no axial play at all for the valve stem. The stem can, for example, be screwed to the housing or connected by detent connections which snap into the housing. When the screw-on cover containing the round drain hole is loosened, it shifts relative to the valve stem whose axial movement is limited. Thus the seal of the valve stem is removed from the drain hole and the drain hole is automatically opened so that the liquid can drain out. As soon as the liquid is drained out, the screw-on cover can be unscrewed completely from the housing in order then to change the filter cartridge.

An advantage of this embodiment of the invention is that the drain hole is automatically opened by the partial unscrewing of the screw-on cover. Consequently, the plug for the drain hole does not have to be accessible to special tools, such as a wrench. Since there is no need to provide working space for a tool to open the drain, the liquid filter according to the invention can also be installed in confined spaces. The result is a greater freedom in the geometrical configuration of the internal combustion engine.

An advantageous embodiment of the invention results if the valve stem is mounted on a support tube which in turn is fastened in the housing. This also results in a limitation of the axial play of the valve stem with respect to the housing. A support tube must be provided in most applications in order to support the filter cartridge against the pressure difference which exists across the filter medium. If the valve stem is attached directly to the support tube, it can have a shorter construction than if it is attached to the housing. Thus the stability of the valve stem is improved and material is saved. This leads ultimately also to an improvement of the economy of the solution.

An especially advantageous embodiment of the invention results when the support tube is releasably fastened both to the housing and to the screw-on cover. In this case the connection to the screw-on cover must be provided with axial play, which ends at an axial abutment or stop when the cover is screwed on. Its attachment to in the screw-on cover must furthermore require movement only in an axial direction, and not in a radial direction, to make it possible to screw on the cover. The range of axial play which is formed by the stops in the screw-on cover, must be less than the axial movement of the screw-on cover that is necessary to open the drain. This causes the support tube to initially remain in the housing when the screw-on cover is opened, so that the valve stem is withdrawn from the drain hole in the screw-on cover as described above. The residual liquid then can drain out of the screw-on cover. When the cover is opened further, the support tube reaches the axial stop in the screw-on cover. Since greater force is required to release the support tube from this axial stop than the force holding the support tube in the housing. Therefore, when the liquid filter is opened, the support tube remains in the screw-on cover. If the filter cartridge is fastened accordingly, it remains on the support tube, and it can thus be removed from the housing together with the screw-on cover. This facilitates uncomplicated replacement of the filter, particularly when the available space is very restricted. In particular, the last drops of oil which drip from the filter cartridge are caught by the cover, so that an even cleaner filter change becomes possible.

The combination of the two solutions offered by the invention is especially advantageous in restricted spaces. This means that the drain hole is automatically opened by the unscrewing of the cover, and by providing a draining device the discharged residual liquid can be carried to a collection container. Two especially advantageous possibilities are envisioned for attaching the draining device, preferably a drain hose, to the drain hole provided with a valve stem.

The hose connection, e.g. nipple, for attaching the drain hose can be formed by the drain hole itself in the screw-on cover. This hose connection points outward, so that a hose can be attached before the screw-on cover is unscrewed. The flexibility of the hose permits the screw-on cover to be rotated a few revolutions so that the drain hole is automatically opened.

Another possibility is to provide the valve stem at its extremity with a tubular discharge end. This forms the drain opening and is provided with openings therethrough. When the filter cartridge is in the installed state, the openings through the valve stem are covered by a tubular sleeve in the screw-on cover. When the cover is unscrewed, the bores shift to a position interiorly of the screw-on cover, so that the residual liquid can pass through the bores into the drain end. In this way it is possible to drain the residual liquid out of the filter.

It is advantageous to design the discharge or drain end as a hose nipple. The drain hose can be attached to such a nipple as described above. This has the additional advantage that the valve stem does not rotate when the cover is unscrewed. This simplifies handling when changing the filter, since the hose can be brought to an accessible place before the cover is unscrewed and remain there during the screwing movement.

To improve the operational reliability of the filter, a bypass valve can be provided in the support tube. If the support tube is connected to the cover through an axial stop, this connection must be permeable to liquid to permit access to the bypass valve. Otherwise the bypassing liquid could not enter the internal space formed by the support tube, which makes it possible to bypass the filter.

In accordance with the invention, the filter cartridge necessary for the filter replacement described above can be equipped beforehand with a support tube into which the valve stem is integrated. The support tube can be releasably connected with the filter cartridge, or the support tube and the filter cartridge can be permanently connected to each other. The seal between the filter cartridge and the support tube can be provided directly by the end plates of the filter cartridge. The support tube, however, can also be cast in one piece with at least one of the end plates resulting in a permanent connection. In this case the support tube will always be replaced together with the filter element.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
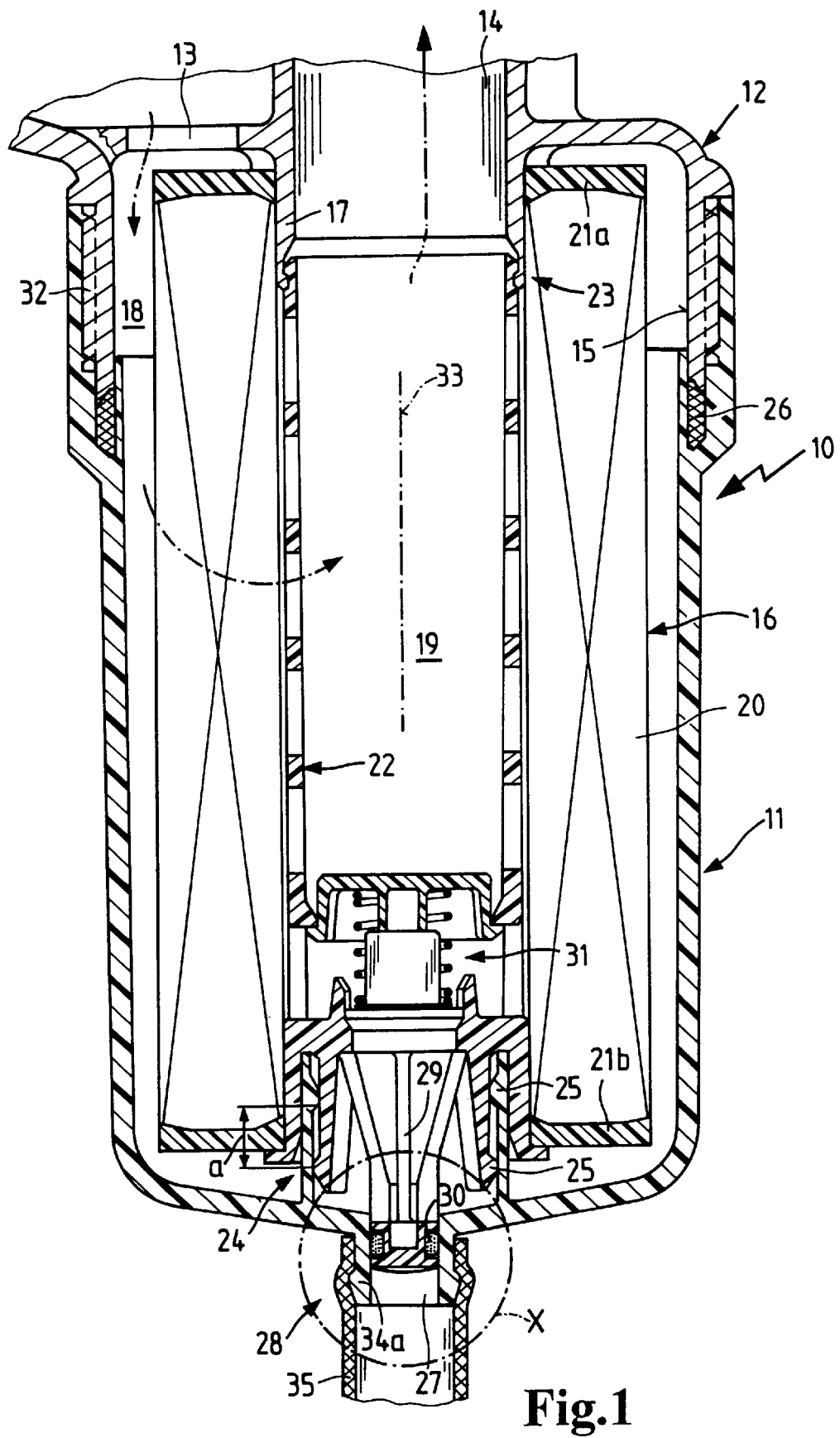
FIG. 1 is a longitudinal section through the filter of the invention, with a valve stem and hose nipple attached to a support tube.

The filter illustrated in FIG. 1 is comprised of a casing 10 which includes a screw-on cover 11 which is screwed to a pot-like or cylindrical housing 12. The housing is a part of a motor block not shown in further detail. An inlet 13 and an outlet 14 for the lubricating oil of the internal combustion engine also are provided in this motor block. The relative lengths of the housing 10 and cover 11 may vary, so long as together they form an enclosure of sufficient length to receive a filter cartridge as described hereinafter.

The housing has a downwardly facing cartridge opening which permits the installation of a filter cartridge 16. The filter cartridge is installed by pushing it onto a support 17 so that a seal is achieved between a raw (i.e. unfiltered) liquid side 18 and a clean (i.e., filtered) liquid side 19 of the filter medium 20. The sealing is accomplished by the upper end plate 21a, which is constructed of elastic or resilient material. The lower end plate 21b is sealed by a support tube 22 which can be inserted into the clean side 19 of the filter cartridge 16 after the filter cartridge has been mounted on the support 17, so that a catch or snap fastener 23 engages between the support tube 22 and the support 17. Then the threaded cover 11 can be screwed on from underneath, thereby closing an axial fitting 24 which is provided with a range of axial play a. The range of axial play a is established by appropriately spaced noses or projections 25 which are contained in the screw-on cover on the one hand and in the support tube on the other. The screw-on cover is sealed relative to the housing part by a seal or gasket 26. Also, a drain bore 27 of an outlet 28 in the bottom of the screw-on cover 11 must be sealed. For this purpose the support tube 22 is provided with a valve stem 29, the end of which extends into the drain bore 27 and closes it via a seal or gasket 30.

The direction of flow of the lubricating oil through the filter to be cleaned during normal operation is indicated by arrows. The oil flows from the outside through the filter cartridge 16 into the interior, thus making it possible for it to pass from the inlet 13 to the outlet 14. In addition, a bypass valve 31 is disposed in the support tube 22. If there is an unacceptable increase in the pressure difference between the clean side 19 and the raw side 18, bypass valve 31 opens so that the supply of lubricant oil to the internal combustion engine is assured.

When the filter cartridge 16 is to be changed, the screw-on cover 11 is initially loosened by a few turns from the housing 12. This results in an axial displacement of the screw-on cover which must be less than the range of axial play a. A screw thread 32 between the cover 11 and the housing 12 must be constructed longer than the range of axial play a. Therefore, after the first few turns of the cover, the cover is still connected to the housing. The support tube 22 is still held securely in the housing 12 by the catch 23. Since the drain bore 27 is arranged precisely in the central axis 33 of the housing 10, both axial and radial relative movement is possible between valve stem 29 and the cover 11 which contains the drain bore 27. By unscrewing the cover, therefore, the valve stem 29 is withdrawn from the drain bore 27, so that the residual oil in the cover can drain out. To assure problem-free removal of the residual oil, the drain bore 27 is provided with a hose nipple 34a. Before the drain is opened, a hose 35 can be attached to this nipple, which can extend to a collecting vessel, not shown, provided for collecting the liquid.

When the residual oil has drained out of the housing, the screw-on cover 11 can be unscrewed further. Then the projections 25 of the axial retaining means form a stop, such that the force necessary to overcome this stop is greater than that required to undo the catch 23. Therefore, as the screw-on cover is unscrewed further, the catch 23 is released, so that the support tube 22 remains in the cover 11. If a greater force is needed to release the end plate 21b from the support tube 22 than to release the end plate 21a from the support 17, the filter cartridge 16 also will remain on the cover 11. Thus the filter cartridge can be changed without difficulty.

Figure 2:
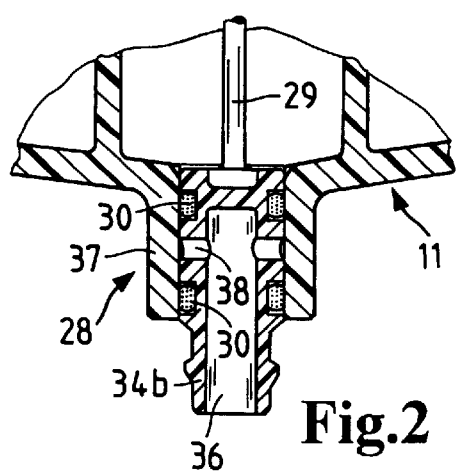
FIG. 2 shows another variant of detail X of FIG. 1 in which the hose nipple is integrated into the valve stem.
Figure 3:
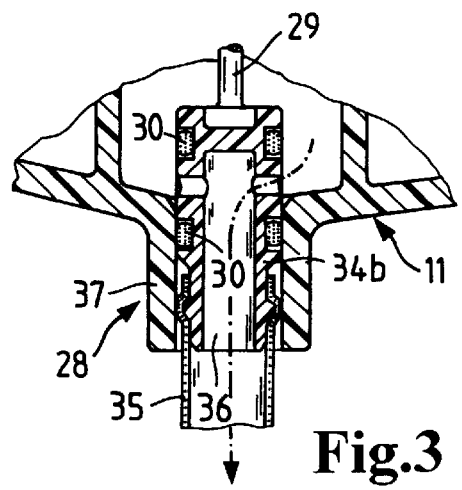
FIG. 3 shows the valve stem of FIG. 2 in the open state.

FIGS. 2 and 3 illustrate an alternative configuration of the outlet 28. In this case, the hose nipple 34b is part of the valve stem 29, which thereby forms a drain end 36. Drain end 36 thus replaces the drain bore 27 of FIG. 1. The opening in the screw-on cover 11 thus serves only as a passageway 37 for the drain end 36. Openings or perforations 38 are provided in the tubular drain end 36 to connect the drain end to the interior of the housing. While the filter is in operation (FIG. 2) these openings are closed off by the gasket 30, thereby preventing oil from draining out. As in the case of the mechanism shown in FIG. 1, the unscrewing of the cover 11 causes a relative movement between the valve stem 29 and the passageway 37 so that the perforations or openings 38 become exposed. Thus the oil can flow through the drain end 36 and the hose 35 attached to the hose nipple 34b as indicated by an arrow in FIGS. 3 and 5.

Figure 4:
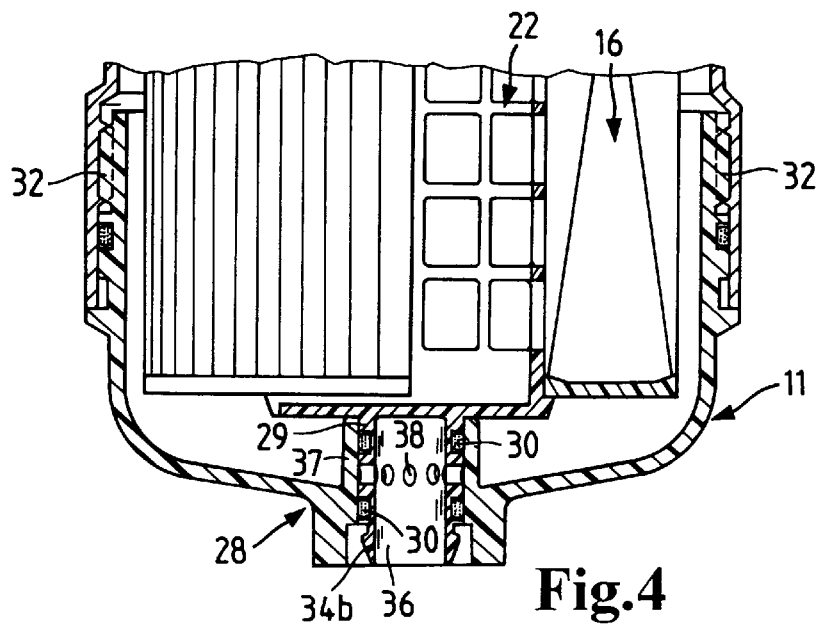
FIG. 4 shows a partial view of a filter element in the installed state in which a support tube with the valve step is integrated in the filter cartridge, with the filter housing being shown in section.
Figure 5:
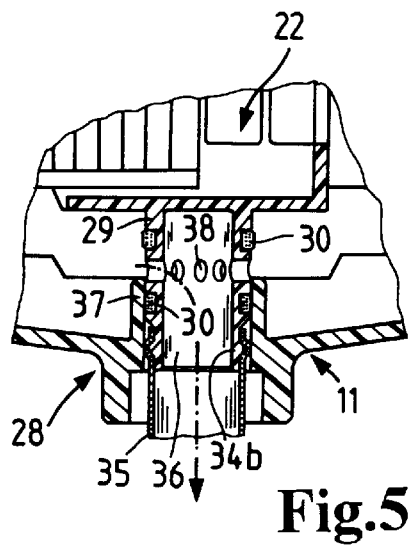
FIG. 5 shows the valve stem according to FIG. 4 with the hose attached and in the open state.

FIGS. 4 and 5 show a further embodiment with a drain end. This is constructed similar to the embodiment illustrated in FIG. 2, in which like parts are identified by the same reference numerals. The difference is that the valve stem 29 is securely integrated with the support tube 22 in the filter cartridge 16. The embodiment shown in FIG. 2 is oriented like the embodiment in FIG. 1, the valve stem 29 being part of a removable center tube. The result is that the support tube of FIG. 4 is not removed together with the cover but together with the cartridge. This explains the different dimensions of the screw-on cover 11 whose thread 32 is in the lower part of the filter cartridge 16. This embodiment is especially simple in design and therefore is less expensive. However, a greater amount of space is required in the area beneath the cartridge installation opening 15 to remove the filter cartridge 16.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A liquid filter comprising a housing with an inlet and an outlet for a liquid to be filtered, said housing having a downwardly facing, filter cartridge installation opening and a screw on cover for closing said cartridge installation opening, a filter cartridge disposed sealingly in said housing between said inlet and said outlet such that liquid from said inlet must pass through the cartridge to reach said outlet, a support tube disposed within said filter cartridge, a releasable snap connection for connecting one end of the support tube to said housing, wherein said screw-on cover is provided with a drain through which the liquid may be discharged from said housing before changing the filter cartridge, wherein said drain comprises a drain opening disposed on a central axis of said housing and cover and extending through said cover, said drain opening being sealingly closed by a valve stem which is fixedly attached to the other end of the support tube and is axially movable in said drain opening when said screw-on cover is moved.

2. A liquid filter according to claim 1, further comprising a gasket interposed between said drain opening and said valve stem for facilitating sealing closure of said drain opening by said valve stem.

3. A liquid filter according to claim 1, wherein said valve stem includes a resilient material which facilitates sealing closure of said drain opening.

4. A liquid filter according to claim 1, wherein said support tube is detached from said housing at said snap connection when said screw-on cover is removed from said housing, and is attached to said screw on cover by a releasable stop connection with a range of axial play α; said range of axial play being limited by a said releasable stop connection and being greater than the axial displacement of said screw-on cover needed to open the drain opening.

5. A liquid filter according to claim 1, wherein said drain opening comprises an outwardly extending hose nipple on the screw-on cover.

6. A liquid filter according to claim 1, wherein said valve stem includes a tubular portion extending through a passageway of the drain opening, said tubular portion having radial openings extending therethrough that are covered by said passageway when said valve stem is in a closed position, and uncovered by said passageway when said valve stem is in an open position.

7. A liquid filter according to claim 6, wherein an outlet end of said tubular portion comprises a hose connector.

8. A liquid filter according to claim 7, wherein said hose connector comprises a hose connecting nipple.

9. A liquid filter according to claim 1, further comprising a bypass valve disposed in the support tube for permitting fluid to bypass the filter if an excessive pressure difference arises across the filter.

* * * * *